United States Patent [19]
Killman

[11] Patent Number: 5,766,285
[45] Date of Patent: Jun. 16, 1998

[54] FILTER ASSEMBLY FOR COVERING A DISK DRIVE SLOT

[76] Inventor: Shannon R. Killman, Rte. 1, Box 711, Summerton, S.C. 29148

[21] Appl. No.: 678,721

[22] Filed: Jul. 11, 1996

Related U.S. Application Data

[63] Continuation-in-part of Ser. No. 503,650, Jul. 18, 1995, abandoned.

[51] Int. Cl.$^6$ ............................................. B01D 46/00
[52] U.S. Cl. ............................ 55/385.6; 55/493; 55/501; 55/508
[58] Field of Search ............................ 55/385.4, 385.6, 55/385.7, 491, 493, 495, 501, 503, 505, 508, 516, 518

[56] References Cited

U.S. PATENT DOCUMENTS

| | | |
|---|---|---|
| 2,347,120 | 4/1944 | Mohun . |
| 3,058,279 | 10/1962 | Metcalfe . |
| 3,060,529 | 10/1962 | Clay . |
| 3,127,259 | 3/1964 | Boylan . |
| 3,881,250 | 5/1975 | Frederickson . |
| 3,971,877 | 7/1976 | Lee . |
| 4,268,286 | 5/1981 | Steer et al. . |
| 4,889,542 | 12/1989 | Hayes . |
| 4,961,849 | 10/1990 | Hull et al. . |
| 4,978,375 | 12/1990 | Il Yoo . |
| 4,980,785 | 12/1990 | Talmadge . |
| 5,075,000 | 12/1991 | Bernard et al. . |
| 5,147,430 | 9/1992 | Kidd . |
| 5,269,824 | 12/1993 | Takita . |
| 5,350,444 | 9/1994 | Gould et al. . |
| 5,417,743 | 5/1995 | Dauber . |
| 5,431,974 | 7/1995 | Pierce .................... 55/385.6 |
| 5,462,569 | 10/1995 | Benjamin ................. 55/385.6 |

FOREIGN PATENT DOCUMENTS

| 1350576 | 3/1963 | France . |
|---|---|---|

*Primary Examiner*—C. Scott Bushey
*Attorney, Agent, or Firm*—Michael A. Mann

[57] ABSTRACT

The invention is a filter assembly which covers a disk drive slot to prevent the intrusion of dust and other particles into the slot. The assembly includes a filter-carrying frame which is pivotally mounted to a computer housing. When mounted to a computer housing, the frame is pivotable between an open position, wherein the frame extends outwardly to allow entry of a disk into an exposed disk drive slot, and an operative position, wherein the frame abuts the housing so that the filter of the frame prevents intrusion of dust and other particulate matter into a disk drive slot. In a preferred embodiment, the frame is formed from a pair of opposing flat members which hold the filter therebetween and which are separable to allow easy filter replacement.

20 Claims, 3 Drawing Sheets

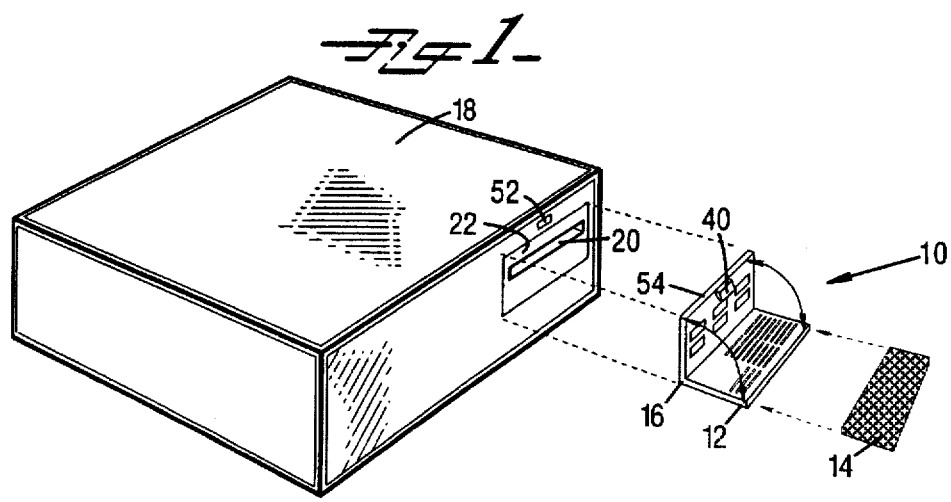
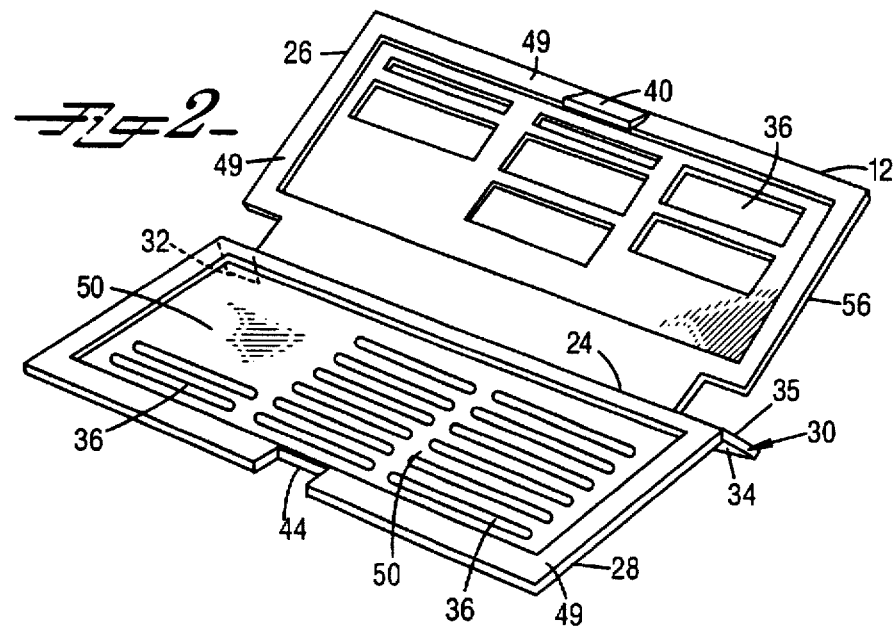
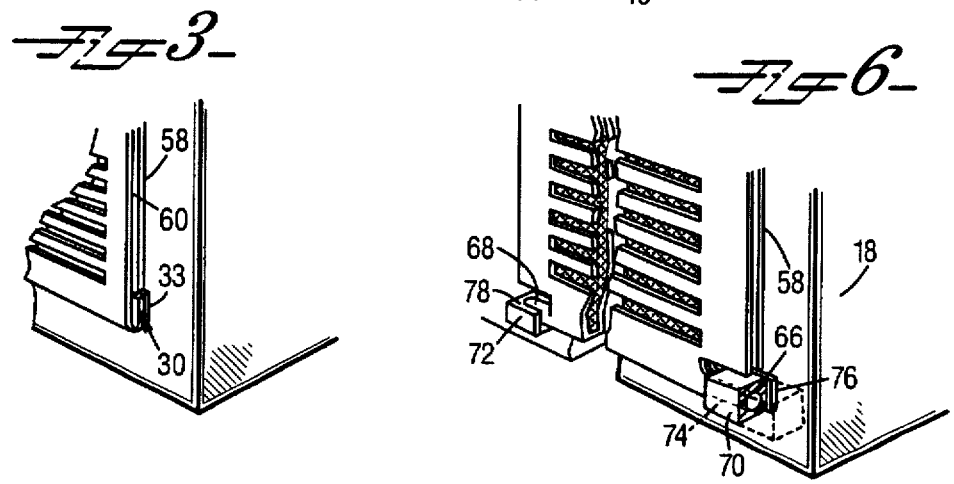

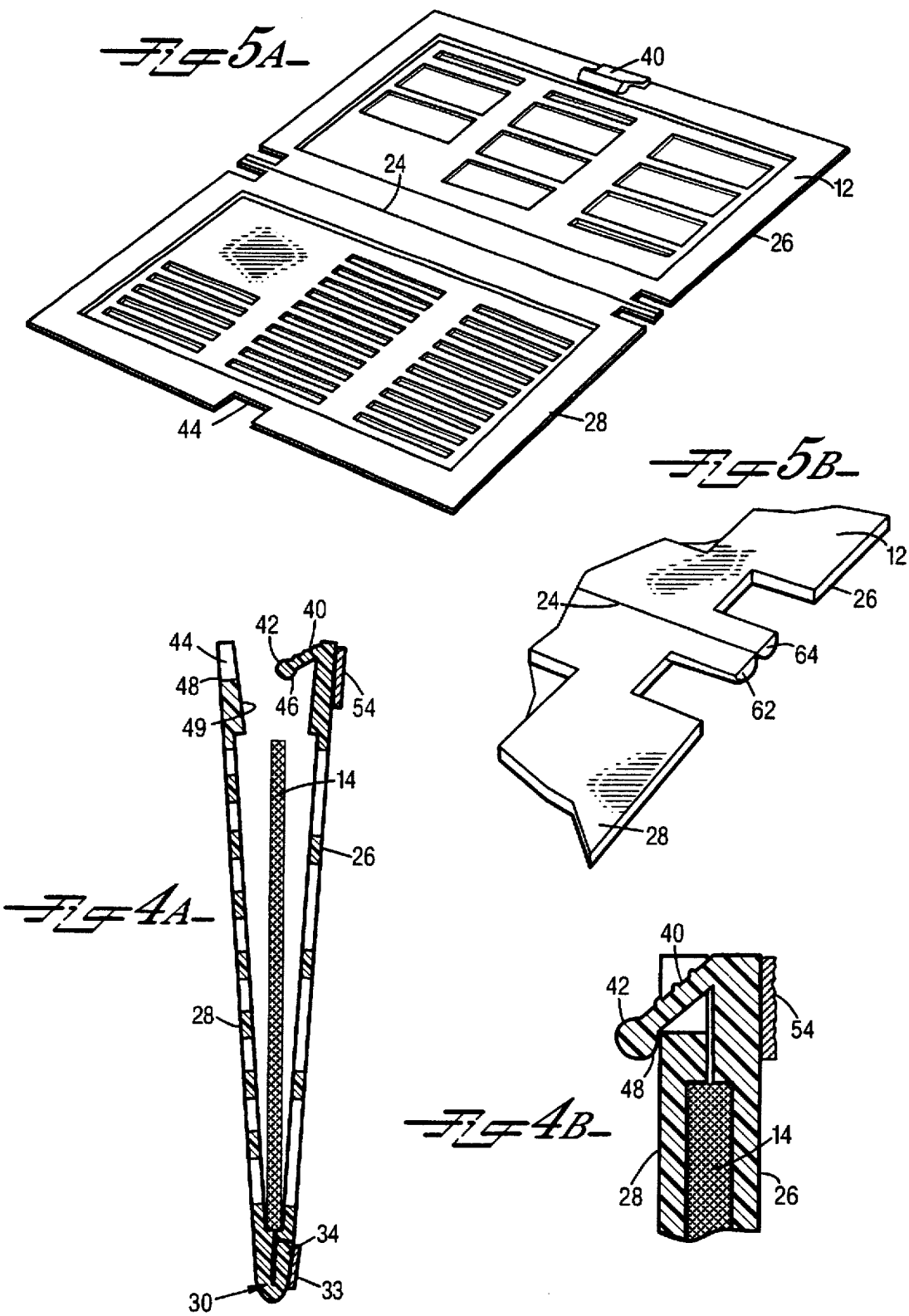

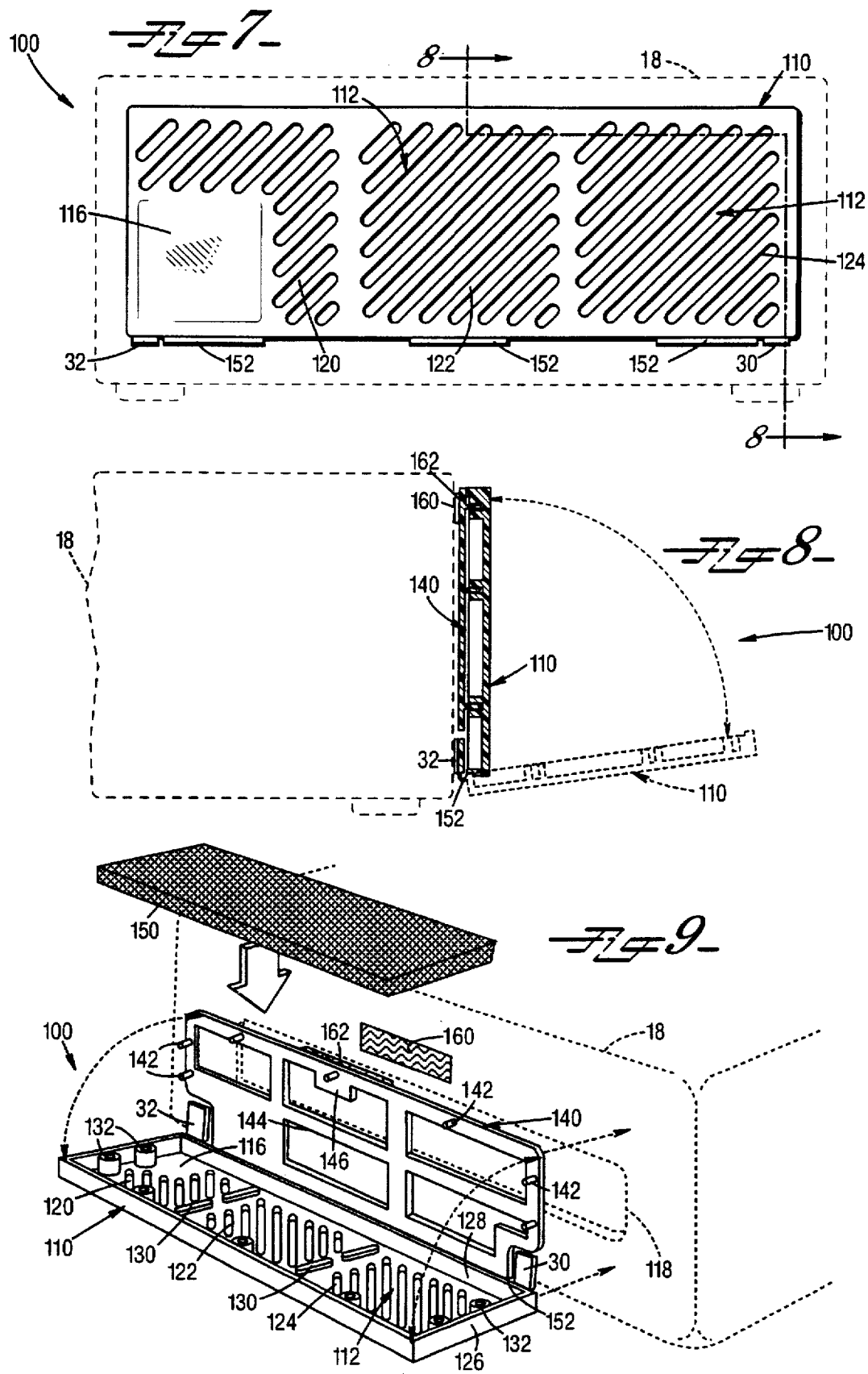

FILTER ASSEMBLY FOR COVERING A DISK DRIVE SLOT

This application is a continuation-in-part of applicant application number 08/503,650 filed on Jul. 18, 1995, now abandoned.

BACKGROUND OF THE INVENTION

1. Field of the Invention:

The present invention relates to filter assemblies in general and in particular to a filter assembly for use in covering a disk drive slot of a computer.

2. Discussion of Background:

Virtually all personal computers have at least one fan for cooling internal components of a computer. Generally, computer fans direct air over internal equipment of the computer and then through vent holes formed in the computer housing. Typically, vent holes are formed at the sides or rear of the housing. When air is pushed out through vent holes of a computer, air is also drawn into the computer through remaining apertures of the housing located opposite the vent holes.

The most common apertures of personal computer housings, aside from vent holes, are disk drive slots of disk drives. Dust and dirt particles commonly enter a computer's interior through a disk drive slot or slots. Because disk drive slots are typically at the front of a computer, opposite the computer's vent holes, particle intrusion is especially problematic when a computer fan is operating.

The problem of disk drive slot particle intrusion is expected to become more severe in the future as computer use increases outside of office buildings. Personal computers are increasingly being used in dust- and contaminant-laden environments, including mechanics' shops, warehouses, farms, and manufacturing facilities.

Prior art devices have addressed the problem of dust and/or contaminant intrusion into a disk drive. U.S. Pat. No. 5,417,743 discloses a multi-layer filter media and suggests that the filter media can be used to prevent the intrusion of particulate matter and vapor contaminants into a disc drive. However, the reference does not disclose a supporting frame for the filter media, and teaches that the filter media is to be applied over an aperture with the use of adhesives.

U.S. Pat. No. 4,980,785 teaches a wedge-shaped slot entry member which is fitted into a disk drive slot in order to prevent the intrusion of dust therein. While the device prevents the intrusion of dust and dirt particles into the computer, it also hinders the flow of cool air into the computer.

U.S. Pat. No. 4,889,542, issued to Hayes, teaches a computer air filter device, wherein the device is a piece of filter material having two strips of adhesive material positioned on one side so that the filter can be attached over an air intake opening within the computer housing. In addition, Hayes shows a frame that is attachable over a disk drive so that the filter can be adhesively attached thereto. The frame is carried by a hinge on the top of the computer and allows the filter to be pivoted out of the way, so that it is possible to access the drive.

There remains a need for a device that prevents entry of dust and contaminants into a computer through a disc drive slot, which can be activated and deactivated easily, and which does not hinder the intrusion of cool air into a computer. Furthermore, there is a need for a filtering device that has a replaceable filter and that is aesthetically pleasing.

SUMMARY OF THE INVENTION

According to its major aspects and broadly stated, the present invention is a filter assembly which covers a disk drive slot of a computer to prevent the intrusion of dust and other contaminant particles into the slot.

Virtually all personal computers have at least one external disk drive. A personal computer may have a 3½ inch disk drive, a 5¼ inch disk drive, a compact disk drive, or a combination of the above types of drives. Disk drives of a personal computer typically have horizontally oriented elongated slots which open toward the front of a computer housing.

The filter assembly of the invention includes a frame which holds a filter. The frame of the assembly further includes hinges, preferably formed along the bottom edge of the frame, which are adapted to be attached to a computer housing below a disk drive slot. When the hinges are attached to a computer housing, the frame is pivotable between an open position wherein the frame is pivoted away from the computer to allow entry of a disk into an exposed disk drive slot, and an operative position wherein the frame is pivoted to abut the computer housing so that the filter of the frame covers the disk drive slot to prevent the intrusion of particulate matter therein.

In a preferred embodiment, the frame is made from a single sheet of plastic formed by an injection molding process. The sheet of plastic is rectangular and has a crease formed therein at about its midpoint to divide the sheet into two sections. A filter is held in position between the two sections by folding the two sections together about the crease. The two sections are separable to allow easy removal of a filter and installation of a new filter into the frame. Clasp ends formed at either section are mated to hold the filter in position between the sections. In another preferred embodiment, one section has a plurality of pegs while the other section has a plurality of annular projections that are designed to receive the pegs, thus holding the filter between the two sections. The sheet further has formed therein perforations which allow air to travel through one sheet section, then the filter, then the other sheet section. In addition, the front section of the frame, facing away from the computer housing when in the operative position, has a closed, smooth portion where there are no perforations.

Hinges of the filter frame are formed by tabs cut away at either end of the crease. The tabs pivot at the crease to allow pivoting of the frame body about the tabs. Double-sided adhesive strips are affixed to the tabs, and the tabs are secured to a computer housing below a disk drive slot.

When a disk is inserted in a disk drive slot, the frame is pivoted downward to allow entry of the disk. After a disk is inserted, the frame is pivoted upward so that the filter is positioned over the slot to prevent intrusion of dust and dirt particles into the slot. The frame is secured in position over the slot with use of micro-loop and hook type fasteners.

A major feature of the invention is the filter-holding frame which is pivotally secured to a computer housing. The frame allows a convenient positioning and removal of filter material over a disk drive slot.

Another major feature of the invention is the arrangement of the frame into a pair of facing separable members. The members, which hold a filter of the assembly, can be separated and closed to allow easy filter replacement.

Yet another important feature of the invention is the construction of the frame from a single sheet of material. The single sheet construction allows simple and inexpensive manufacturing of the frame.

Still another feature of the present invention is the closed portion within the front section. This closed portion provides a convenient place for a sticker that carries a legend or for direct application of a legend, which can be used to identify the computer manufacturer or another type of advertiser or to provide instructions for use.

Other features and advantages will become apparent to those skilled in the art from a careful reading of the Detailed Description of Preferred Embodiment accompanied by the following drawings.

BRIEF DESCRIPTION OF THE DRAWINGS

In the drawings,

FIG. 1 is a perspective installation view of a filter assembly according to the invention illustrating installation of the filter assembly onto a computer housing;

FIG. 2 is a perspective view of a filter frame according to the invention in an unfolded position;

FIG. 3 is a fragmentary perspective view of a filter frame according to the invention showing a filter frame hinge in a folded position and installed on a computer housing;

FIG. 4a is a cross-sectional side view taken along line 4—4 of FIG. 1 showing the clasping arrangement between the frame's members where the frame members are unfolded;

FIG. 4b is a cross-sectional side view taken along line 4—4 of FIG. 1 showing the clasping arrangement between the frame's members where the frame members are folded;

FIG. 5a is a perspective view of a filter frame according to an alternative preferred embodiment of the invention;

FIG. 5b is an enlarged fragmentary view of the frame's axle ends, as shown in FIG. 5a;

FIG. 6 is a fragmentary perspective view of the filter frame of FIG. 5a and FIG. 5b as installed on a computer housing;

FIG. 7 is a front view of a filter assembly according to another preferred embodiment of the present invention;

FIG. 8 is a cross-sectional view taken along line 8—8 of FIG. 7 showing a filter assembly according to another preferred embodiment of the present invention; and FIG. 9 is a perspective view of a filter assembly in the open position with the filter material in an exploded position according to another preferred embodiment of the present invention.

DETAILED DESCRIPTION OF PREFERRED EMBODIMENTS

Shown in FIG. 1 is a filter assembly 10 installed on a computer housing. Filter assembly 10 includes a frame 12 which holds a filter 14 and hinges 16 which are attached to housing 18. Filter assembly 10 is positioned on housing 18 so that filter 14 of the assembly covers a disk drive slot 20. Filter frame 12 is pivotable on housing 18 between open position, wherein the frame is pivoted outwardly to allow insertion of a disk into slot 20, and an operative position, wherein frame 12 is pivoted to a position abutting housing 18 so that filter 14 covers slot 20 and prevents the intrusion of dust and dirt particles into a computer through slot 20.

Virtually all personal computers have at least one external disk drive. A personal computer may have 3½ inch disk drive, a 5¼ inch disk drive, a compact disk drive, or a combination of the above types of disk drives. The above types of disk drives have slots which most typically open toward the front of a computer housing. A personal computer may also have a tape backup drive that has an aperture opening toward an exterior of the computer housing. It will be recognized that the filter assembly of the present invention may be used to cover apertures of this type of drive, and it will also be recognized that the assembly can be used to cover any type of aperture opening at the exterior of a personal computer housing.

Dust and particle intrusion into a disk drive slot is particularly problematic when a computer is running. When a computer is running, a cooling fan operates and directs air over internal computer components and out through vent holes typically located at the rear and/or at the sides of a computer housing. As air is pushed out through vent holes at the rear and sides of a computer housing, dust and particle-containing air is also drawn in through apertures at the front of a computer. The most common of such apertures are disc drive slots.

Often, a disk drive of a personal computer is installed behind a window such as 22 in the computer housing. Frame 12 of the present invention may be of any size so long as filter 14 supported by frame 12 covers a disk drive slot 20, but most preferably, for cosmetic purposes, frame 12 is of a size which entirely covers a disk drive window surrounding a slot. Disk drive windows are of near-standard size, and have dimensions of about 149 mm by about 43 mm. Frame 12 of the present invention normally has a preferred dimension of about 157 mm by about 50 mm. Frame 12 has a preferred dimension of about 157 mm by about 100 mm if frame 12 covers a window behind which a pair of stacked disk drives are installed.

Now referring to FIG. 2, a preferred embodiment of filter assembly frame 12 will be described in detail. Frame 12 is formed from a single sheet of plastic, preferably by an injection molding process. Crease 24 of frame 12 divides the frame into a first frame member and second frame member, 26 and 28, respectively, which may be folded toward one another about crease 24. Hinges 16 of frame 12 are formed by cutting away tabs 30 and 32 from first member 26 at either end of crease 24, so that tabs 30 and 32 may be folded away from first member 26 along crease 24. Double-sided foam adhesive tape strips 33 are affixed to a mounting surface of each tab. A tab's mounting surface is provided either by the tab's first surface 34 or the tab's second surface 35. As shown, each frame member has perforations 36 formed throughout its area. The size and shape of these perforations are not critical. Perforations 36, however, should be formed at least at the areas of each frame member 26, 28 which will front a disk entry slot. Most preferably, perforations 36 formed throughout the entire area of each frame member 26 and 28 are generally evenly distributed.

Referring to FIG. 3, frame 12 is installed on a computer housing 18 by peeling away protective strips from adhesive tape strips 33 of tabs 30 and 32 and pressing the tabs against a computer housing below a disk slot 20. For attaching tabs 30 and 32 to computer housing 18, adhesive tape strips 33 may be affixed to either first surface 34 or second surface 35 of tabs 30 and 32. Preferably, however, an adhesive tape strip 33 is affixed to first surface 34 of each tab 30 and 32. In this way, tabs 30 and 32 will lie flush with first frame member 26 when first frame member 26 is abutted against housing 18, as illustrated in FIG. 3. When the frame is installed on a computer housing, first frame member 26 will face toward computer housing 18, and second frame member 28 will face outwardly from computer housing 18. If double-sided adhesive tape strips 33 are affixed to second surface 35 of tabs 30 and 32, then tape strips 33 should have about the same thickness as first frame member 26, so that strips 33 will not tend to peel from computer housing 18 when first frame member 26 is abutted against housing 18.

Filter 14 is installed in frame 12 by separating frame members 26 and 28 (if not already separated) and inserting filter 14 between the two members. Filter 14 may be made of any filter material that allows air to pass therethrough and which traps dust and other contaminant particles. Most preferably, filter 14 is made of foam filter material and has a thickness of less than about 5 mm. Filter 14 is secured to the frame 12 by folding frame members 26 and 28 toward one another and clamping the two frame members together. Frame members 26 and 28 may be clamped together with use of a clamping device such as a paper clip or any lightweight clamping device having two opposing members normally biased toward one another. Preferably, however, complementary clasping ends are formed to be integral with each respective frame member during the injection molding process.

Referring to FIGS. 4a and 4b, a preferred clasping arrangement for the frame members will be described in detail. First frame member 26 has a clasp 40 extending forwardly therefrom. Clasp 40 includes a lip 42 and is formed to be resilient so that clasp 40 can be moved resiliently upward from first frame member 26. Clasp 40 is received by recess 44 formed in second frame member 28. For engaging the two members, lip 42 of clasp 40 is urged upward slightly and second frame member 28 is pressed toward first frame member 26. Lip 42 of clasp 40 is then released to engage the two members. When engaged, interior surface 46 of lip 42 contacts engaging surface 48 of recess 44, as shown in FIG. 4b. When lip 42 is so engaged, filter 14 will urge second member 28 outwardly so that engaging surface 48 of recess 44 is biased toward and in good contact with interior surface 46 of lip 42. For replacing filter 14, lip 42 of clasp 40 is urged upward once again to separate the two frame members 26 and 28. Filter 14 is removed and replaced, and the two frame members are re-engaged as described above.

For stabilizing filter 14 in frame 12, each frame member 26 and 28 will preferably have formed about its periphery a ridge 49 which defines a depression 50 in each frame member. Filter 14 is partially received by the depression 50 of each frame member. When first and second frame member 26 and 28 are folded together, ridges 49 will abut, or nearly abut, one another, and filter 14 will be received in a hollow area of frame 12 defined by opposing depressions 50 of each frame member 26 and 28.

In one illustrative embodiment of the invention, the sheet forming frame 12 will have a thickness of about 2 mm at the ridge of each frame member and a thickness of about 1 mm at the depression of each frame member. A preferred filter 14 in such an embodiment will have a thickness of slightly more than 2 mm, so that filter 14 will urge second frame member 28 outwardly toward lip 42 of clasp 40.

When installed on a computer housing, frame 12 is pivotable between an open position, wherein frame 12 extends outwardly to allow entry of a disk into a disk drive slot 20, and an operative position, wherein frame 12 is abutted against computer housing 18 so that dust and other contaminant particles are prevented from entering slot 20. A variety of different means may be employed to secure frame 12 in an abutted position against housing 18. For example, frame 12 may be secured to housing 18 with use of adhesives or with use of a wing nut or nuts secured to the housing. Preferably, however, frame 12 is secured to housing 18 with use of complementary micro-loop and hook type fasteners, which may be "VELCRO" type fasteners. A first adhesive-backed micro-loop and hook type fastener section 52 is applied to housing 18 above slot 20, as shown in FIG. 1, and a second adhesive-backed fastener section 54 is applied to interior surface 56 of first frame member 26. Second fastener section 54 engages first fastener section 52 to secure frame 12 in an abutted position against housing 18. While one pair of fasteners 52, 54 will be sufficient to hold frame 12 in position against housing 18, additional fastener sections may be applied about the periphery of frame 12 to prevent intrusion of dust particles through gaps 58 between frame sides 60 and housing 18, as shown in FIG. 3. For optimum prevention of particles through gaps 58, a seal can be formed about the periphery of frame interior surface 56.

FIGS. 5a, 5b and FIG. 6 illustrate an alternative hinge arrangement for the frame. In an alternative hinge arrangement, injection molded frame 12 is in the form as shown in Fig. 5a. Formed at either end of crease 24 are a pair of axle sections 62 and 64. Each axle section has a semi-circle cross section. When second frame member 28 is folded about crease 24 against first frame member 26, the axle sections meet one another to form cylindrical axle ends 66 and 68, as shown in FIG. 6.

In the alternative hinge arrangement, axle receiving means must be secured to a computer housing before frame 12 is mounted to the housing 18. Axle receiving means are shown in FIG. 6. In a preferred embodiment, the axle receiving means comprise a pair of boxes 70 and 72. Each box 70 and 72 has fixed thereon a section of double-sided adhesive tape 76 to enable attachment of each box to computer housing 18. When affixed to housing 18, first and second boxes 70 and 72 must be spaced apart to a distance approximately equal to the distance between first axle end 66 and second axle end 68. To accomplish such spacing, first and second boxes 70 and 72 may be applied with the aid of a spacer bar. Once boxes 70 and 72 are attached to housing 18, axle ends 66 and 68 are installed in the boxes. First box 70 has a closed top 74 and second box 72 has an open top 78. To pivotally mount frame 12 to housing 18, first axle end 66 is slid generally sideward into first box 70, and then second axle end 68 is lowered generally downward into second box 72.

Another preferred embodiment of filter assembly 100 is shown in FIGS. 7–9. In this preferred embodiment, filter assembly 100 comprises a front section 110 and a back section 140, which together hold a filter 150. Front section 110 has a perforated portion having a plurality of perforations 112 penetrating through front section 110 to allow air to pass therethrough. However, front section 110 has a closed portion 116 where there are no perforations 112. In other words, closed portion 116 has no perforations 112. Closed portion 116 is a smooth, unperforated section preferably located on the bottom left of front section 116 when filter assembly 100 is in the operative position, similar to that described above, so that the perforated portion is over a slot 118 and closed portion is not over slot 118.

As the computer paraphernalia market steadily increases, advertisers and computer manufactures continue to look for innovative places to advertise and display their trademarks; consequently, closed portion 116 plays an important role in providing a location for carrying a legend, either directly or indirectly, such as by a sticker, for example. In addition, closed portion 116 can be used as a convenient place for locating directions or other instructions for the user.

In this preferred embodiment, there is a first group of perforations 120, a second group of perforations 122, and a third group of perforations 124 carried by front section 110. Second group of perforations 122 and third group of perforations 124 are similar, while closed portion 116 is positioned within first group of perforations 120, so that first group of perforations 120 is dissimilar from second and third groups of perforations 122, 124. In addition, closed portion 116 is rectangular in shape and extends within first group of perforations 120 from the bottom left corner of front section 116, thus covering some of perforations 112, as specifically shown in FIG. 7. It will be recognized that the shape of closed portion 116 may be modified or changed without departing from the spirit and scope of the present invention.

Front section 110 also has a depression 128 on its back side 126 which has a depth sufficient to hold a filter 150. Within depression 128 there is at least one rib 130, preferably two, which further secures filter 150 within filter assembly 100 when front section 110 and back section 140 are closed together. In addition, back section 140 has a plurality of pegs 142 extending from back section 140 that matingly engage a plurality of annular projections 132 positioned on front section 110 within depression 128. Pegs 142 and annular projections 132 are aligned and secure front section 110 to back section 140 in its closed position, thus retaining filter 150. Furthermore, pegs 142 and annular projections 132 are easily removed from each other and then closed again, thus allowing filter 150 to be easily replaced without damaging front section 110 or back section 140 of filter assembly 100.

Back section 140 and front section 110 are preferably formed from a single piece of plastic, as discussed above. In this design, front section 110 and back section 140 are pivoted and closed about a hinge 152 that is also preferably formed from the plastic.

Back section 140 has a plurality of holes 144 extending therethrough, which along with perforations 112, allow air, dust, and other particles to pass through filter assembly 100. In this embodiment, holes 144 are bigger than perforations 112, because of the reduced manufacturing and material costs. In addition, while front section 110 is exposed and thus must be aesthetically pleasing, back section 140 is not exposed and thus the other factors discussed above play a more important role in the design of back section 140 and holes 144. Furthermore, back section 140 can be provided with a tab 146 that facilitates the opening of filter assembly 100 and the replacement of filter 150.

In this preferred embodiment, filter assembly 100 is secured over window 22 by tabs 30, 32 much like the embodiments described above. Additionally, it will be recognized that other attachment methods may be used, including the hinge and box attachment also described above. Filter assembly 100, as discussed above, has an open position, where access to the drives is available, and an operative position, where filter assembly 100, is positioned over window 22. In this embodiment, filter assembly 100 is secured in the operative position by a first and second fastener 160, 162, much like that described with the other preferred embodiments.

It will be clear to those skilled in the art to which the present invention pertains from a reading of the foregoing that many changes and substitutions can be made to the preferred embodiments without departing from the spirit and scope of the present invention, which is defined by the appended claims.

What is claimed is:

1. A filter assembly for covering a window surrounding a drive with a slot in a computer housing, said assembly comprising:

a frame having a front section and a back section, said front section having a perforated portion with perforations extending therethrough and a closed section having no perforations, said front section also having a back side, said back side having a depression and at least one rib therein;

a hinge carried by said front section and said back section so that said frame can be folded;

means carried by said front section and said back section for releasably securing said front section to said back section;

a filter carried within said depression of said front section and secured within said frame by said at least one rib when said frame is folded;

means integral with said frame for attaching said frame to said housing, said attaching means pivotally attaching said frame to said housing so that said frame is pivotable between an open position wherein said frame extends outwardly from said housing to expose said slot, and an operative position wherein said frame abuts said housing to cover said slot; and means for securing said frame to said housing, said securing means releasably securing said frame to said housing when said frame has been pivoted to said operative position.

2. The assembly of claim 1, wherein said closed portion is adapted to carry a legend.

3. The assembly of claim 1, wherein said attaching means comprises:

a pair of tabs extending from said frame, each of said tabs having a mounting surface adapted for attachment to said housing; and means carried by said mounting surfaces for adhering said tabs to said housing so that said frame is pivotally attached to said housing when said mounting surfaces are adhered to said housing.

4. The assembly of claim 1, wherein said frame is dimensioned to cover said drive.

5. The assembly of claim 1, wherein said attaching means comprises:

a pair of axle ends extending from said frame; and axle receiving means attachable to said housing, said axle receiving means receiving said axle ends so that said frame can pivot within said axle receiving means.

6. The assembly of claim 1, wherein said securing means comprises:

a first micro-loop and hook type fastener section appliable to said housing; and a second micro-loop and hook type fastener section appliable to said frame, said second fastener section being adapted to be received by said first section.

7. The assembly of claim 1, wherein said frame comprises:

a plurality of pegs carried by said back section; and a plurality of annular projections carried by said front section, said plurality of annular projections adapted to receive said plurality of pegs.

8. The assembly of claim 1, wherein said attaching means comprises:

first and second axle ends extending from said frame;

a first box for receiving said first axle end; and a second box for receiving said second axle end.

9. A filter assembly for covering a disk drive of a computer housing, said disk drive having a slot, said filter assembly comprising:

a frame having a front section and a back section, said front section and said back section pivotally connected by a hinge, said front section having a front face with a perforated section and a closed section, said front section also having a back side with a depression formed therein, said back section having at least one rib;

a plurality of pegs carried by said back section;

a plurality of annular projections carried by said back side of said front section, said plurality of annular projections on said front section aligned with said plurality of pegs on said back section so that said plurality of pegs engage said plurality of annular projections;

a filter carried within said depression of said front section and secured within said frame by said at least one rib;

a pair of tabs integral with said frame for pivotally attaching said frame to said housing, said pair of tabs pivotally attaching said frame to said housing so that said frame is pivotable between an open position wherein said frame extends outwardly from said housing to expose said slot, and an operative position wherein said frame abuts said housing to cover said slot;

a first hook and loop fastener carried by said back section; and a second hook and loop fastener carried by said computer housing, said first hook and loop fastener and said second hook and loop fastener cooperating to hold said frame in the operative position.

10. The assembly as recited in claim 9, wherein said closed portion is adapted to carry a legend.

11. The assembly of claim 2, wherein said attaching means comprises:

a pair of tabs extending from said frame, each of said tabs having a mounting surface adapted for attachment to said housing; and means carried by said mounting surfaces for adhering said tabs to said housing so that said frame is pivotally attached to said housing when said mounting surfaces are adhered to said housing.

12. The assembly of claim 2, wherein said frame is dimensioned to cover said drive.

13. The assembly of claim 3, wherein said frame is dimensioned to cover said drive.

14. The assembly of claim 3, wherein said securing means comprises:

a first micro-loop and hook type fastener section appliable to said housing; and a second micro-loop and hook type fastener section appliable to said frame, said second fastener section being adapted to be received by said first section.

15. The assembly of claim 4, wherein said securing means comprises:

a first micro-loop and hook type fastener section appliable to said housing; and a second micro-loop and hook type fastener section appliable to said frame, said second fastener section being adapted to be received by said first section.

16. The assembly of claim 2, wherein said frame comprises:

a plurality of pegs carried by said back section; and a plurality of annular projections carried by said front section, said plurality of annular projections adapted to receive said plurality of pegs.

17. The assembly of claim 5, wherein said frame comprises:

a plurality of pegs carried by said back section; and a plurality of annular projections carried by said front section, said plurality of annular projections adapted to receive said plurality of pegs.

18. The assembly of claim 2, wherein said attaching means comprises:

first and second axle ends extending from said frame;

a first box for receiving said first axle end; and a second box for receiving said second axle end.

19. The assembly of claim 7, wherein said attaching means comprises:

first and second axle ends extending from said frame;

a first box for receiving said first axle end; and a second box for receiving said second axle end.

20. The assembly of claim 7, wherein said attaching means comprises:

a pair of tabs extending from said frame, each of said tabs having a mounting surface adapted for attachment to said housing; and means carried by said mounting surfaces for adhering said tabs to said housing so that said frame is pivotally attached to said housing when said mounting surfaces are adhered to said housing.

* * * * *